July 16, 1963   D. F. J. QUICK ETAL   3,097,504
COOLING SYSTEMS FOR AIRCRAFT
Filed Oct. 24, 1960
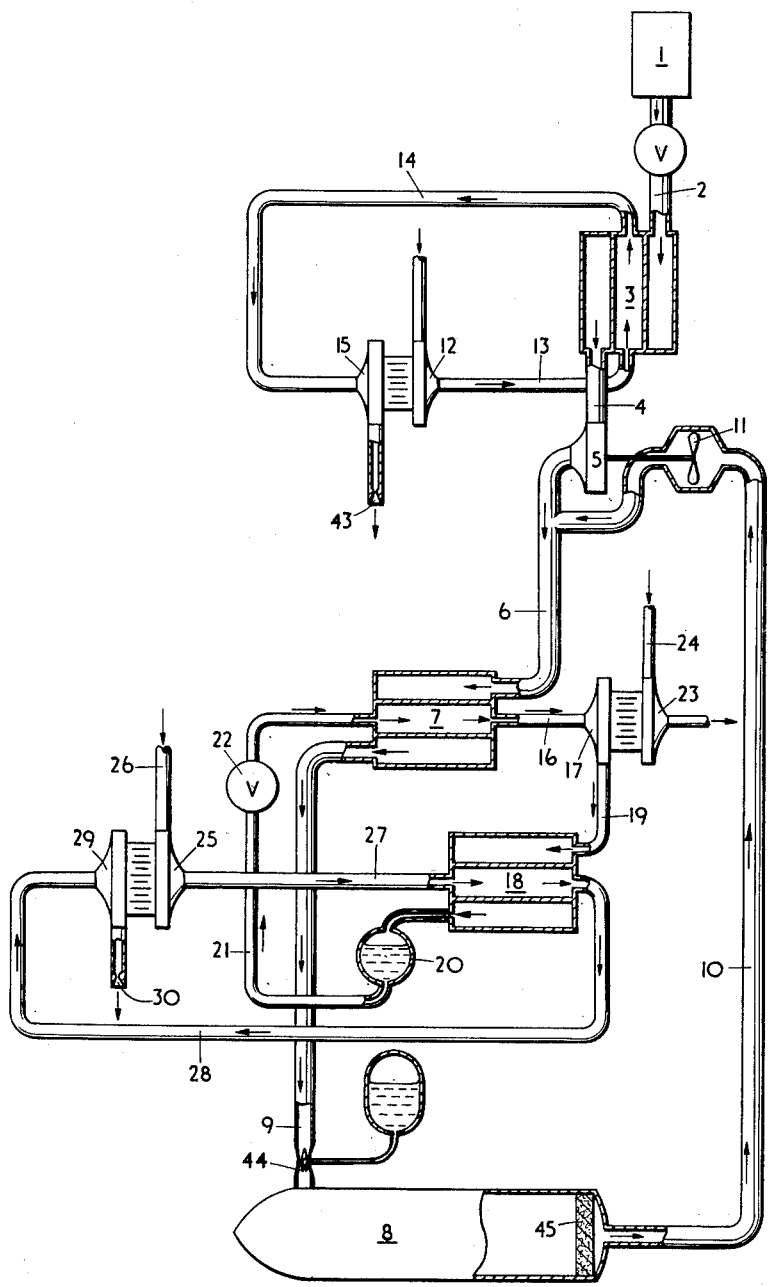

United States Patent Office 3,097,504
Patented July 16, 1963

3,097,504
COOLING SYSTEMS FOR AIRCRAFT
Desmond F. J. Quick, Yeovil, Somerset, and Donald J. Leech, Dorchester, Dorset, England, assignors to Normalair Limited, Yeovil, England
Filed Oct. 24, 1960, Ser. No. 64,448
Claims priority, application Great Britain Oct. 30, 1959
4 Claims. (Cl. 62—241)

This invention relates to a system for cooling air for use in an enclosure, and may be used, although not exclusively, for cooling air for use in the cabin of a transport aircraft flying at high altitudes and at a speed considerably greater than the speed of sound.

In addition to problems associated with the high average body skin temperatures incurred by the conditions of flight, which can be about 220° C. for an aircraft flying at Mach 2.6 and at an altitude of about 70,000 ft. high temperatures are involved when ram air is passed into heat exchangers.

It is therefore an object of the invention to provide a system for the supply of cooled air to a substantially sealed enclosure, cabin or the like, comprising a substantially closed circuit, wherein said air is recirculated after being subjected to dehumidification, partial purification and cooling, and further augmented to replace any air lost due to the inevitable leakages through cabin walls, seals and the like.

It is a further object of the invention to provide an alternative system for the supply of cooled air to a substantially sealed enclosure cabin or the like, wherein the fresh air supply is sufficient to avoid subjecting the air to dehumidification and partial purification.

According to the invention there is provided a system for cooling air in an enclosure, comprising a bleed air supply to said enclosure, an air circulating system and a closed circuit vapour cycle system.

The invention consists in a system for cooling air in an enclosure, according to the preceding paragraph, wherein said air circulating system passes said bleed air through one or more air/air heat exchanger means, an expansion turbine means and an evaporator means of said closed circuit vapour cycle system.

The invention consists in a system for cooling air used in high altitude supersonic transport aircraft, comprising in combination a bleed air supply and air circulating system, and a closed circuit vapour cycle system.

The invention consists in a system for cooling air used in high altitude supersonic aircraft, according to the preceding paragraph, wherein said bleed air supply and said air circulating system comprises in conduit combination, one with another, an engine compressor means, adapted to supply air bled from the intermediate stage of said engine compressor means.

The invention also consists in a system for cooling air used in high altitude supersonic aircraft, according to the second preceding paragraph, wherein said closed circuit vapour cycle cooling system comprises in conduit combination one with another, a refrigerant compressor, a condenser, liquid receiver, expansion valve and an evaporator, said compressor being driven by an expansion turbine means.

The invention also consists in a system for cooling air used in a high altitude supersonic aircraft according to the second preceding paragraph, wherein said bleed air is passed through one or more air/air heat exchanger means, an expansion turbine means and an evaporator means of said closed circuit vapour cycle system.

The invention also consists in a system for cooling air used in high altitude supersonic aircraft, according to the preceding paragraph, wherein the first air/air heat exchanger means is provided with transverse cooling air flow from an expansion turbine means of a first reversed bootstrap unit means, said first reversed bootstrap unit means comprising said expansion turbine means, having ram air supply, and driving a compressor means, said compressor means having air supply from said first air/air heat exchanger means, and exhausting to ambient.

The invention also consists in a system for cooling air used in high altitude supersonic aircraft according to said third preceding paragraph, wherein said condenser has transverse cooling air flow from an expansion turbine means of a second reversed bootstrap unit means, said second reversed bootstrap unit means comprising said expansion turbine means, having ram air supply, and driving a compressor means, said compressor means having air supply from said condenser, and exhausting to ambient.

The invention also consists in a system for cooling air used in high altitude supersonic aircraft according to said preceding paragraph, wherein said refrigerant augmenting means comprises a reservoir containing liquid refrigerant, said reservoir receives refrigerant from said condenser by way of conduit means and allows the refrigerant to flow by way of conduit means to said expansion valve.

The invention also consists in a system for cooling air used in high altitude supersonic aircraft according to the fourth preceding paragraph wherein said expansion turbine means drives a recirculating fan means.

The invention also consists in a system for cooling air used in high altitude supersonic aircraft according to the preceding paragraph, wherein said cabin is provided with a means for controlling the humidity and partial purification of the air, said cabin being in conduit communication with said recirculating fan means, and said recirculating fan means being in conduit communication with said evaporator means.

Further objects and advantages of the invention will become apparent from the following detailed description with reference to the accompanying diagrammatic drawings wherein the drawing shows a first embodiment of a system for cooling air used in high altitude supersonic transport aircraft according to the invention.

In carrying the invention into effect according to one convenient form by way of example only, referring to FIGURE 1, we provide an engine compressor 1, whereby air bled from an intermediate stage of said engine compressor 1, is passed by way of conduit 2 to an air/air heat exchanger 3. Air is then passed from said air/air heat exchanger 3 to an expansion turbine 5 by way of conduit 4, and from said expansion turbine 5 to an evaporator 7 by way of conduit 6. Air leaving said evaporator 7 passes into a cabin 8 by way of ducting 9, and a distribution ducting, not shown, said cabin 8 is provided with means 44 for controlling the humidity and means 45 for providing partial purification of the air. Air leaving said cabin 8 is returned to said evaporator 7 by way of conduit 10, and recirculation fan 11 and recirculated, said recirculation fan 11 being driven by said expansion turbine 5. Air lost due to leakage in the circuit is replaced by air bled from intermediate stage of said engine compressor 1, by way of conduit 2. Ram air is supplied to an expansion turbine 12, where it is cooled and passed through said air/air heat exchanger 3 by way of conduits 13 and 14 to a compressor 15 from which it is discharged by way of jet nozzle 43, said compressor 15, being driven by said expansion turbine 12, operates as a first reversed bootstrap unit in conjunction with said expension turbine 12.

Air bled from the engine is supplied to a turbine 23 by way of conduit 24, said turbine 23 drives a compressor 17 which is in communication with a condenser 18, by way of conduit 19. A liquid receiver 20 receives a solution of dichlorotetra-fluoroethane, hereinafter referred to as the refrigerant, from said condenser 18 and passes the refrigerant said evaporator 7, by way of conduit 21 and expansion valve 22, said evaporator 7 returning the refrigerant to said compressor 17, by way of conduit 16, for recirculation.

Ram air supplied to turbine 25 by way of duct 26, is expanded by said turbine 25 and passed to said condensor 18 by way of duct 27, said condenser 18 is in communication by way of conduit 28 with said compressor 29, said compressor 29, being driven by said turbine 25 exhausts the air to ambient by way of jet nozzle 30 and acts as a second reversed bootstrap unit in conjunction with said turbine 25.

In operation of the invention, air bled from an intermediate stage of said engine compressor 1, at a substantially high temperature and pressure, flows by way of conduit 2, to an air/air heat exchanger 3. The air/air heat exchanger 3 cools the air and passes it by way of conduit 4, to an expansion turbine 5, where said expansion turbine 5 reduces the pressure and temperature of the air, and passes the air, by way of conduit 6, to an evaporator 7. The evaporator 7 further reduces the temperature of the air, and passes the air by way of ducting 9 into cabin 8, said cabin 8 having means 44 for controlling the humidity and means 45 for providing partial purification of the air. Air leaving said cabin 8 is return to said evaporator 7, by way of conduit 10 and a recirculation fan 11, driven by said expansion turbine 5, for recirculation. A first reversed bootstrap unit is provided in communication with said air/air heat exchanger 3, so that ram air is not passed directly into said air/air heat exchanger 3, the high temperature and pressure of the ram air is first reduced by the expansion turbine 12 of the first reversed boostrap unit, said expansion turbine 12 passes the air, by way of conduit 13, into heat exchange contact, in said air/air heat exchanger 3, with the air bled from said engine compressor 1. The air/air heat exchanger 3 is in communication with the compressor 15, of the first reversed bootstrap unit, by way of conduit 14, said compressor 15 exhausts the air to ambient by way of jet nozzle 43.

An expansion turbine 23, is supplied with air bled from the engine, by way of conduit 24, said expansion turbine 23 driving a compressor 17. The compressor 17 receives gaseous refrigerant from said evaporator 7, by way of conduit 16, said compressor 17 passes the refrigerant in a gaseous state at a substantially high temperature and pressure by way of conduit 19 to a condenser 18. The condenser 18 communicates with a liquid receiver 20, which holds a reserve supply of liquid refrigerant that may be used to augment the flow of refrigerant. Upon leaving said liquid receiver 20 the refrigerant is passed to said evaporator 7 by way of conduit 21 and expansion valve 22, said evaporator 7 boils the refrigerant to a gaseous state, the latent heat required being obtained from the air passing through said evaporator 7.

A second reversed bootstrap unit is provided in communication with said condenser 18, so that ram air is not passed directly into said condenser 18, the high temperature and pressure of the ram air is first reduced by the expansion turbine 25 of the second reversed bootstrap unit. The expansion turbine 25 passes the air, by way of conduit 27 through said condenser 18, said condenser 18 being in communication with the compressor 29 of the second reversed bootstrap unit, by way of conduit 28, said compressor 29 exhausts the air to ambient by way of jet nozzle 30.

We claim as our invention:

1. In an aircraft of the high altitude supersonic type having an engine compressor, a system for cooling air in an enclosure thereof comprising, in combination, a supply conduit, said supply conduit connectible with an intermediate stage of the engine compressor supplying bleed air, a heat exchanger, the supply conduit connected to the heat exchanger whereby air is cooled by said heat exchanger, a conduit connecting the output of the heat exchanger with the enclosure, a closed refrigerant vapor cycle coolant circuit including an evaporator, compressor, condenser and expansion, valve, said heat exchanger comprising the evaporator and a reversed bootstrap means including a turbine compressor unit driven by ram air for cooling the refrigerant passing through the condenser.

2. A cooling system according to claim 1 and further including a recirculation conduit returning used air from said enclosure to said supply conduit.

3. In an aircraft of the high altitude supersonic type having an air compressor, a system for cooling air in an enclosure thereof comprising, in combination, a supply conduit, said supply conduit connectible with an intermediate stage of the engine compressor supplying bleed air, a first heat exchanger, the supply conduit connected to the first heat exchanger whereby air is cooled by said first heat exchanger, an expansion turbine, conduit means connecting the output of the first heat exchanger with the expansion turbine, a second heat exchanger, conduit means connecting the output of the expansion turbine with the second heat exchanger, conduit means connecting the output of the second heat exchanger with the enclosure, a closed refrigerant vapor cycle coolant circuit including a turbo-compressor, a condenser, an expansion valve and an evaporator interconnected to form a closed refrigeration cycle, the second heat exchanger comprising the evaporator, the turbo-compressor delivering vaporized refrigerant to the condenser to be cooled and liquified and passed to the expansion valve controlling refrigerant flow through said evaporator prior to return to the compressor of said turbo-compressor, and first and second reversed bootstrap coolant means for cooling said first heat exchanger and said condenser respectively, said first and second reversed bootstrap coolant means being operated by ram air.

4. A cooling system according to claim 3 and further comprising a recirculation conduit including a fan to return used air from said enclosure to said conduit means downstream of said expansion turbine.

References Cited in the file of this patent

UNITED STATES PATENTS

| | | |
|---|---|---|
| 1,945,441 | Miller | Jan. 30, 1934 |
| 2,398,655 | Mayer | Apr. 16, 1946 |
| 2,473,496 | Mayer | June 14, 1949 |
| 2,485,590 | Green | Oct. 25, 1949 |
| 2,959,028 | Beggs | Nov. 8, 1960 |
| 2,959,029 | Best | Nov. 8, 1960 |